United States Patent [19]
Long et al.

[11] Patent Number: 5,604,009
[45] Date of Patent: Feb. 18, 1997

[54] NON-ADHESIVE BONDED TUFTED CARPET AND METHOD FOR MAKING THE SAME

[75] Inventors: John M. Long, Ringgold; Kent A. Snyder, Dalton, both of Ga.

[73] Assignee: Synthetic Industries, Inc., Chickamauga, Ga.

[21] Appl. No.: 348,341

[22] Filed: Dec. 2, 1994

[51] Int. Cl.⁶ .......................... B32B 3/02; D03D 27/00; D04H 1/04
[52] U.S. Cl. ................ 428/95; 428/97; 28/107; 28/109
[58] Field of Search .................. 428/95, 97, 296; 28/107, 109

[56] References Cited

U.S. PATENT DOCUMENTS

| | | | |
|---|---|---|---|
| 3,285,797 | 11/1966 | Harrison et al. | 428/95 |
| 3,640,786 | 8/1972 | Carpenter | 156/73 |
| 4,439,476 | 3/1984 | Guild | 428/97 |
| 4,808,459 | 2/1989 | Smith | 428/95 |
| 5,240,530 | 8/1993 | Fink | 156/72 |
| 5,256,224 | 10/1993 | Gillyns et al. | 156/72 |
| 5,370,757 | 12/1994 | Corbin et al. | 156/72 |
| 5,532,035 | 7/1996 | Corbin et al. | 428/95 |

FOREIGN PATENT DOCUMENTS

| | | |
|---|---|---|
| 2065683 | 10/1992 | Canada. |
| 0547533 | 6/1993 | European Pat. Off.. |
| 0568916 | 11/1993 | European Pat. Off.. |
| 93/12285 | 6/1993 | WIPO. |

OTHER PUBLICATIONS

News Release; "Trevira One"; Hoechst Celanese; Sweeney; Nov. 17, 1992.

"All–Polyester Carpet System: Environmental and Performance Aspects" by Stockman et al., pp. 207–213 (undated).

Primary Examiner—Terrel Morris
Attorney, Agent, or Firm—Renner, Kenner, Greive, Bobak, Taylor & Weber

[57] ABSTRACT

A non-wet processed tufted carpet (10) includes a plurality of face yarns (12), dyeable to the desired carpet color prior to tufting, which are tufted into and through a primary backing fabric (14) and which are more securedly held in place by a secondary backing fabric (16) without the use of an adhesive binder, the secondary backing fabric locking the face yarn in place upon the application of heat to a non-wet surface of the secondary backing fabric non-adjacent to the primary backing fabric. The tufted carpet (10) does not include any latex or binding adhesives which may cause odors or emit volatile organic chemicals. Moreover, the face yarn (12), primary backing fabric (14), and secondary backing fabric (16) are made of the same type of polymeric material, thereby creating a carpet which is wholly recyclable. The carpet (10) also uses only predyed fibers and yarns as the face yarn, thereby eliminating the need to dye or wet process and dry the carpet during its manufacture. The present invention also provides a non-wet processing method for the manufacture of tufted carpet.

21 Claims, 1 Drawing Sheet

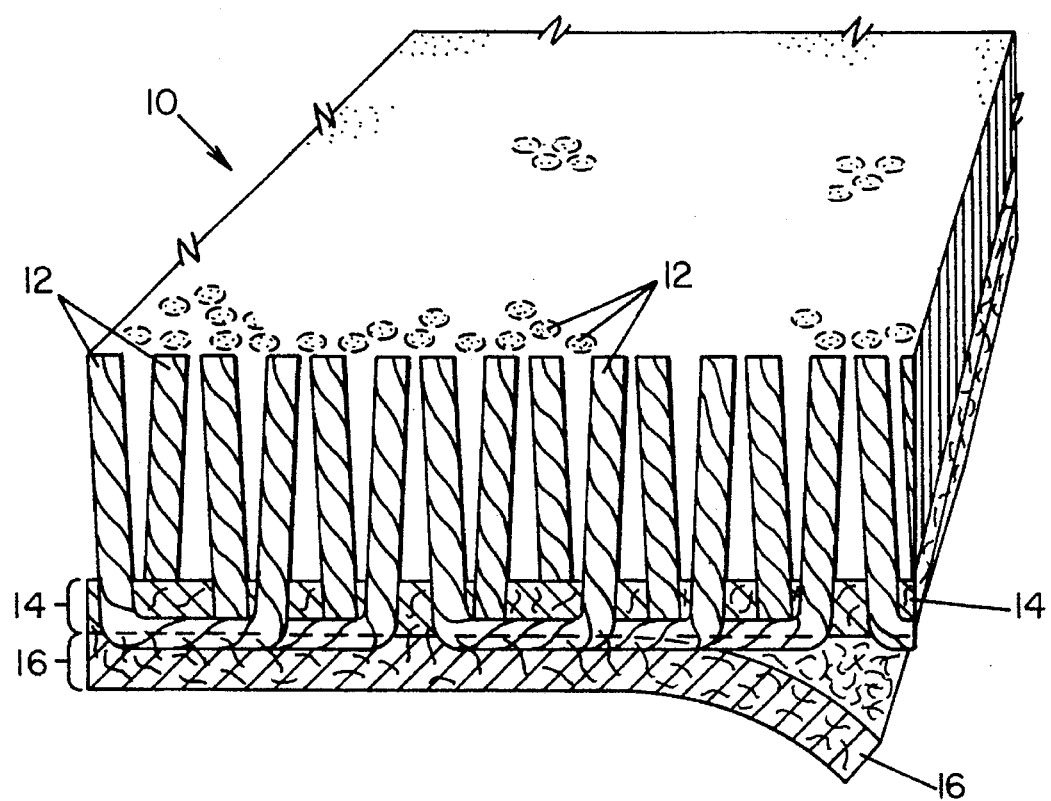

NON-ADHESIVE BONDED TUFTED CARPET AND METHOD FOR MAKING THE SAME

TECHNICAL FIELD

The present invention relates to carpet and the manufacture thereof. More particularly, the present invention relates to a predyed, non-polyester, tufted carpet which is devoid of any latex or adhesives for binding a primary backing fabric to a secondary backing fabric. Such a tufted carpet can be recycled and does not employ volatile organic chemicals. The tufted carpet of the present invention is manufactured by the use of a needlebonding method to interlock the primary and secondary backing fabrics, the primary backing fabric having face yarn tufted thereto. The secondary backing fabric is then heated, such as by infrared heat, to strengthen the bond between the interlocked primary and secondary backing fabrics through at least partial thermal fusion without dyeing and/or wet processing and drying the carpet.

BACKGROUND OF THE INVENTION

Tufted carpet is widely used today in the United States and abroad. Such carpet is produced by tufting machines which are essentially multi-needled sewing machines. The tufting machines push or, more specifically, sew the face yarns of the carpet (also referred to as pile yarns) through a primary backing fabric, forming loops in the face yarns. The machines also hold the face yarns in place while the needles are withdrawn. The resulting loops formed by the face yarns are then either released to form loop-pile, tufted carpet, or cut to form cut-pile, tufted carpet.

A secondary backing fabric, attached to the backstitched side of the primary backing fabric, i.e., the side opposite the protruding face yarns, is used to hold the tufted face yarn in place and is typically attached to the primary backing fabric by a latex or other binding adhesive applied to the backstitched side of the primary backing fabric. It is well known, however, that the latex or binding adhesives, such as hot melt adhesives, employed by the carpet industry must be cured prior to use, and that the latex and binding adhesives may emit volatile organic chemicals and odors. Consequently, the reduction or elimination of the latex or binding adhesives is seen as being highly desirable.

In addition to improving the quality of the air inside buildings and other like places where carpet is used, the elimination of latex and adhesives provides for a much more easily recyclable carpet. That is, without the latex or adhesives, all of the components of the carpet, including edge trim, can be easily recycled. Thus, limited dump site space should no longer be a problem for the carpet industry. Moreover, the carpet is capable of using only one fiber material, such as polypropylene, or nylons, for the face yarns and primary and secondary backing fabrics, thereby eliminating the necessity that the individual compositional components be separated prior to recycling.

Attempts have been made heretofore to produce non-adhesive bonded carpet. In fact, Hoechst Celanese has recently developed a new method of constructing carpet using 100 percent polyester face yarns and backing fabrics. That carpet system eliminates all other fibrous materials, including polypropylene and nylon, as well as latex or binding adhesives.

The carpet produced by Hoechst Celanese uses undyed polyester spun yarns as the face yarns of the carpet. These face yarns are tufted or pushed through a primary backing fabric made from polyester nonwoven fibers. A secondary backing fabric also made of nonwoven polyester fibers is sewn to the back of the tufted primary backing fabric to lock the tufted face yarns in place, to cover the back of the primary backing fabric, and to add strength and dimensional stability to the carpet beyond that which is provided by the primary backing fabric itself.

Uniquely, at least one of the backing fabrics (either the primary or the secondary) of the Hoechst Celanese carpet contains low melt polyester fibers having a lower melt point (melt point equals approximately 105° to 110° C.) than the polyester fibers found in the other backing fabric. Consequently, when the secondary carpet backing fabric is heated during or after dyeing, wet processing, and/or drying, the polyester fibers of the secondary and primary backing fabrics melt together, thereby remaining attached to each other and keeping the tufted face yarns from being removed easily.

While this process is suitable for use with polyesters and low-melt polyesters, fabrics employing the same material having the same melt temperatures are not suitable for the Hoechst process. Moreover, unlike polypropylene, polyester as used by the carpet industry is generally not predyed during the fiber-forming stage of production. Instead, polyester is dyed through the use of "wet processing" with conventional dyeing equipment. Generally, the standard types of dyeing equipment used in the carpet industry are beck and Kuster (or continuous dyeing). Beck is used for dyeing fabric in rope form and consists essentially of a tank and a reel to advance the fabric. Kuster essentially wets the carpet or fabric, applies dyes and any other necessary chemicals with a doctor blade, fixes the dyes in a festoon steamer, and washes and dries the carpet or fabric in a pass through the equipment. It is a requirement of the Hoechst process that the carpet be dried thoroughly to remove all liquid. Preferably, such a step is accomplished using a flow-through dryer which blows air from both above and below the carpet. This drying process activates the low melt polyester fiber and binds the system together.

Thus, with both of these types of dyeing equipment, the carpet is wetted, dyed and dried. Drying after dyeing thus activates the low melt fiber components found in one of the two backing fabrics to bind the two backing fabrics together. Nevertheless, tufted carpet has not been made heretofore in the absence of wet processing, which carpet is devoid of latex and adhesives.

SUMMARY OF INVENTION

It is, therefore, an object of the present invention to provide a tufted carpet.

It is another object of the present invention to provide a tufted carpet, as above, which is devoid of any latex or adhesives.

It is still another object of the present invention to provide a tufted carpet, as above, which is wholly recyclable.

It is yet another object of the present invention to provide a tufted carpet, as above, which employs predyed, non-polyester fibers or yarns.

It is a further object of the present invention to provide a tufted carpet, as above, which includes primary and secondary backing fabrics which may be either woven or nonwoven.

It is still a further object to provide a method for the manufacture of tufted carpet.

It is yet a further object to provide a method for the manufacture of tufted carpet, as above, which does not include the step of dyeing or wet processing the carpet.

At least one or more of the foregoing objects, together with the advantages thereof over the known art relating to carpet and the manufacture thereof, which shall become apparent from the specification which follows, are accomplished by the invention as hereinafter described and claimed.

In general, the present invention provides a non-wet processed tufted carpet comprising a face yarn, dyeable to the desired carpet color prior to tufting; a primary backing fabric, the face yarn being tufted to the primary backing fabric; and a secondary backing fabric attached to the primary backing fabric without the use of an adhesive binder, the secondary backing fabric locking the face yarn into place upon the application of heat to a non-wet surface of the secondary backing fabric not adjacent to the primary backing fabric.

The present invention also includes a non-wet processing method for making tufted carpet, having face yarn, a primary backing fabric, and a secondary backing fabric, the method including the steps of selecting a face yarn, dyeable to the desired carpet color prior to tufting; tufting the face yarn to the primary backing fabric; attaching the primary backing fabric to the secondary backing fabric without the use of an adhesive binder; and heating a non-wet surface of the secondary backing fabric non-adjacent to the primary backing fabric to partially melt the secondary backing fabric, thereby securing the face yarn to the primary backing fabric.

Still further, the present invention provides a non-wet processed tufted carpet produced by the method of tufting a face yarn, dyeable to the desired carpet color prior to tufting, to the primary backing fabric; attaching the primary backing fabric to the secondary backing fabric without the use of an adhesive binder; and heating a non-wet surface of the secondary backing fabric to partially melt the secondary backing fabric non-adjacent to the primary backing fabric, thereby securing the face yarn to the primary backing fabric.

BRIEF DESCRIPTION OF THE DRAWING

The drawing is a schematic side elevation of a carpet according to the present invention.

PREFERRED EMBODIMENT FOR CARRYING OUT THE INVENTION

As noted hereinabove, the present invention is directed toward a tufted carpet which, unlike most carpet produced today, does not include any latex or binding adhesives. Such a carpet is highly desirable in that it may be less expensive due to the lack of a constituent, but also can be readily recycled and does not emit odor-causing, volatile chemicals which may pollute the environment.

While a 100-percent polyester tufted carpet has been developed which excludes these latex adhesives, the manufacture of such a polyester carpet has significant process steps, such as dyeing or wet processing and drying, which are required because of the use of polyester. More particularly, one backing fabric includes a low-melt polyester which is activated during the dyeing and wet processing and drying stage, thereby permitting the backing fabrics to bind together. The elimination of the dyeing or wet processing steps during the manufacture of tufted carpet was, heretofore, unknown for such fabrics. In other words, the ability to mechanically interlock and thermally bond other polymeric materials together using infrared heaters to achieve an acceptable dimensional stability and "tuft bind" was unknown, especially in view of the fact that the 100-percent polyester tufted carpet used low-melt polyester in one backing fabric to thermally bond with the other backing.

A carpet of the present invention is denoted generally by the numeral 10 in the drawing. Such a carpet 10 includes a plurality of face yarns 12 which are tufted or sewn into and through a primary backing fabric 14 and which are more securely held in place by the secondary backing fabric 16 attached to the backstitched side of primary backing fabric 14. The secondary backing fabric 16 aids in providing improved dimensional stability and strength of the carpet and covers the back of the primary backing fabric 14. The resultant tufted carpet 10 does not include any latex or binding adhesives which may cause odors or emit volatile organic chemicals (VOCs).

The face yarns 12 of the tufted carpet 10 may be made from any material known in the art suitable for use as face yarns as detailed hereinbelow, and are preferably made from polymers selected from the group consisting of polyolefins, polyamides, and mixtures thereof. Most preferred is polypropylene and nylon.

The face yarns 12 may be prepared by any conventional means known in the art. Preferably, conventional equipment and methods are employed to make spun yarns or bulked continuous filament yarns comprising a plurality of polymeric fibers produced by conventional extrusion methods with conventional equipment. The term face yarns is thus intended to include all forms of yarn that can be employed to manufacture carpet whether spun yarn, bulk continuous filament yarn or other forms of yarn. The face yarns used in the carpet of the present invention preferably employ fibers and/or spun yarns or bulked continuous filament yarns which have been suitably pigmented to the desired color prior to or during the extrusion or fiber-forming process, such as by solution dyeing or the like. Where the natural color of the face yarn is the desired color, a separate dyeing operation is not necessary.

The primary backing fabric 14 may be produced using industry accepted methods. Desirably, the primary backing fabric 14, as well as the secondary backing fabric 16, should be made from the same polymers as the face yarns in order to provide a wholly recyclable carpet without the need to separate the various polymeric constituents. Nevertheless, practice of the present invention does not preclude the use of different polymers for the fabrics and primary and secondary backing fabrics.

Preferably, the primary backing fabric 14 is made from either nonwoven fabrics or woven slit films. Where nonwovens are employed, the primary backing fabric is produced using conventional methods for making nonwoven fabrics. Generally, such fabrics are produced by aligning the fibers in one general direction, plying the fibers into layers while stretching the fabric to provide at least some dimensional stability, needling the layers and compressing them together to form the fabric, and heat-treating or glazing one side of the fabric to provide even better dimensional stability.

In a preferred embodiment, the nonwoven primary fabric is a carded web crosslaid needlepunched fabric having either polypropylene or nylon fiber. Where polypropylene fiber is utilized, about 5 denier×4 inch fibers are preferred, with the fiber weight ranging of from about 3 to about 6 ounces per square yard, and with about 4.5 ounces per square yard being most preferred. Where nylon is utilized, the same preferred fibers provide a fiber weight range of from about 6 to about 10 ounces per square yard, with about 10 ounces per square yard being most preferred. Moreover, the nylon is preferably a blend of nylon and low-melt nylon. While the exact ratio of the blend will depend upon the desired stiffness of the carpet, a ratio of 70/30 nylon to low-melt nylon by weight should generally not be exceeded.

The non-glazed side of the primary backing fabric has looser fibers and provides a better fiber surface to entangle with the secondary backing fabric upon needlepunching. Accordingly, the heat-treated side of the fabric will be considered the "face" side.

Where woven slit films are employed, warp yarns of from about 400 to about 600 denier are interlaced (woven) with filling (cross-machine) yarns of from about 900 to about 1100 denier, with warp yarns having about 475 denier and filling yarns having about 1025 denier being most preferred. A fabric weight for the primary backing fabric of from about 2.5 to about 4.5 ounces per square yard is recommended, with about 3.25 ounces per square yard being most preferred.

The secondary backing fabric 16 may also be produced using industry accepted methods. Preferably, the secondary backing fabric 16 is made from either nonwoven fabrics or woven slit tape or spun yarns. Where nonwovens are employed, the secondary backing fabric is produced using the same or similar conventional methods for making nonwoven fabrics as was the primary backing fabric, but the heat treatment of one side thereof is generally not performed until the construction of the carpet is essentially complete. Thus, the secondary backing fabric is loosely needled and provides ample fiber surface for attachment to the primary backing fabric.

More preferably, the nonwoven secondary backing fabric, which can be used with either the woven or nonwoven primary backing fabric, is a carded web crosslaid needlepunched fabric having either polypropylene or nylon fiber. Where polypropylene fiber is utilized, the preferred 5 denier×4 inch staple fibers provide a fiber weight ranging from about 4 to about 8 ounces per square yard, with about 5 ounces per square yard being most preferred. Where nylon is utilized, the same size staple fibers as the polypropylene fibers are preferably used. However, it is preferred that the fiber weight range from about 4 to about 6 ounces per square yard, with about 6 ounces per square yard being most preferred. Moreover, the nylon is preferably a blend of nylon and low-melt nylon. This ratio of nylon to low-melt nylon can vary depending upon the desired stiffness of the carpet, but usually does not exceed 30 percent by weight of the low-melt nylon fiber.

When woven slit tape or spun yarns are employed as the secondary backing fabric, the primary backing fabric should be of the nonwoven variety. This allows for an adequate entanglement of fibers to occur during the needlepunching process. For wovens, warp yarns of from about 400 to about 525 denier are interlaced with filling (cross-machine) yarns of from about 1725 to about 1800 denier, with warp yarns having about 450 denier and filling yarns having about 1775 denier being most preferred. A fabric weight for the secondary backing fabric of from about 2.0 to about 3.25 ounces per square yard is recommended, with about 2.1 ounces per square yard being most preferred.

To manufacture the tufted carpet of the present invention, the face yarns are initially tufted or punched into and through the non-treated (non-glazed) side of the primary backing fabric as described hereinabove. This prevents excessive damage to the primary backing fabric from the tufting process, especially when nonwoven backing fabric is utilized. Moreover, when needled nonwoven fabrics are used, tufting into the non-treated side of the primary backing fabric provides the "soft", or loose fiber side for attaching to the secondary backing.

The tufted, primary backing fabric is then attached to the secondary backing fabric by consolidation of the fibers from the secondary backing fabric into the primary backing fabric. This is best done by needlepunching the secondary backing fabric into the primary backing fabric. In the needlepunching process, the tufted primary backing fabric is fed into the loom face down and the secondary backing fabric is laid on top of it. The fibers from the secondary backing fabric are carried to and entangled with fibers from the primary backing fabric by way of barbed needles which penetrate through the secondary backing fabric and into the primary backing fabric. The entanglement of fibers from the primary and secondary backing fabrics interlocks the backings and integrates the system to achieve a high level of dimensional stability without the use of adhesives or bonding agents.

Preferably, the needlepunching process uses two doubleneedleboard downpunch needlelooms. Each needleboard has a needle density of about 5000 to 6000 needles per meter. In typical use, the needleloom operates at a throughput speed of up to about 60 feet per minute with the boards needling at approximately 1250 strokes per minute. The combination of the throughput speed and the strokes per minute of the needleboards yields approximately 1000 punches per square inch with an advance of about 14.6 inches per stroke. It is believed that at least 900 punches per square inch of backing fabric is required in order to provide the dimensional stability and strength necessary to keep the secondary backing fabric attached and secured to the primary backing fabric.

The needles used in the needlepunching process may be of any type (e.g., barbed) suitable for integrating the primary and secondary backing fabrics, but the preferred needles are the standard Foster type, star blade needles 15×18×36×3 SBA or their equivalent. These needles penetrate the primary and secondary backing fabrics to a depth of about 4 mm. This depth is preferred and is believed to provide maximum integration of fibers of the two backing fabrics without tacking the tufted face yarn or otherwise deforming the carpet itself.

It will be appreciated, however, that the above-specified operation is only a preferred procedure for attaching the secondary backing fabric to the primary backing fabric. Other means of attaching may also be employed so long as no latex or binding adhesives are utilized. Moreover, with respect to the needlepunching process described hereinabove, it will be appreciated that alternative operations of the needleloom can be used. For instance, slower throughput speeds and a reduction of strokes per minute of the needleboards will still enable the needleloom to provide the necessary amount of punches per square inch through the primary and secondary backing fabrics.

Upon completion of the needlepunching process, the combined tufted primary backing fabric and secondary backing fabric is then thermally bonded. A pin type tenter frame is preferably employed to hold the carpet in place during this heat treatment process. The heating unit is preferably multiple banks of infrared heaters controlled by an optical pyrometer. The heat from each bank is staged to prevent thermal shock, and the temperature of the secondary backing fabric and carpet is measured by the optical pyrometer(s). The preferred temperature to which the secondary backing fabric is heated depends upon the type of polymer used in the fabric and the conditions under which the fabric is being heated. Of course, the temperature should not be so high as to cause complete degradation of the polymers employed. In most instances, a temperature which promotes optimal delamination strength, yet prevents overfusing of the backing fabrics, is desired. Such a temperature for each particular polymer can readily be determined by methods well known to those skilled in the art without undue experimentation, but for polyolefin fabrics, heating is preferably performed in the fabric temperature range of about 157° C. to 163° C., while for polyamide fabrics heating is preferably performed in the fabric temperature range of about 250° C. to 265° C.

In the heating process, it is generally recognized that only the surface of the secondary backing fabric which is not adjacent to the primary backing fabric is subjected to heat. Thus, that side of the secondary backing fabric will become glazed and stiff. The predetermined heating temperature allows the entangled fibers of the primary and secondary backing fabrics to at least partially melt, thereby locking the tufted face yarns in place. It is further noted that this heating is performed while the entire carpet is dry, and is not performed in order to remove any liquid or wetness in the carpet.

In addition, edge heaters are employed to prevent a thermal sink along the tenter chain. Moreover, to prevent overheating or fusion of the face yarns, ambient air may be blown over the carpet surface, preferably through adjustable baffles. The volume of air can be controlled to optimize this effect. To insulate the tenter frame system from variable ambient air conditions and to create an oven-like effect, the tenter frame may be enclosed.

Finally, the face yarns may be cut to provide cut-pile tufted carpet. Shearing of the face yarns provides a more uniform appearance of the carpet. Edge trims may also be cut from the carpet. The edge trims can then be recycled as noted hereinabove.

Thus it should be evident that the carpet of the present invention is wholly recyclable and does not require any latex or other types of binding adhesives. The carpet is particularly suited for use in buildings and the like, but is not necessarily limited thereto. Moreover, it will be appreciated that the carpet of the present invention can be manufactured with equipment and methods other than what is detailed hereinabove, it being understood that the equipment and methods for producing the face yarns and backing fabrics, as well as other materials, has been provided for purposes of demonstration only.

Based upon the foregoing disclosure, it should now be apparent that the carpet described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the methods of manufacture of the face yarns, primary backing fabric and secondary backing fabric according to the present invention are not necessarily limited to those disclosed hereinabove. Moreover, as noted hereinabove, other means for attaching the secondary backing fabric to the primary backing fabric and other means for heating the surface of the secondary backing fabric which is not adjacent to the primary backing fabric can be substituted for the needlepunching and infrared heating steps. Thus, the scope of the invention shall include all modifications and variations that may fall within the scope of the attached claims.

What is claimed is:

1. A tufted carpet comprising:

face yarns;

a primary backing fabric, said face yarns being tufted into said primary backing fabric; and a secondary backing fabric attached to said primary backing fabric without the use of an adhesive binder, wherein said face yarns, said primary backing fabric and said secondary backing fabric consist essentially of polypropylene fibers having essentially the same melt temperature such that substantially all adjacent fibers of said primary backing fabric and said secondary backing fabric are thermally bonded together thereby locking substantially all of said face yarns within said primary backing fabric.

2. A tufted carpet, as set forth in claim 1 wherein the tufted carpet is wholly recyclable.

3. A tufted carpet, as set forth in claim 1, wherein said primary backing fabric comprises nonwoven fabric and said secondary backing fabric comprises woven yarns.

4. A tufted carpet, as set forth in claim 1, wherein said primary and said secondary backing fabrics comprise nonwoven fabrics.

5. A tufted carpet, as set forth in claim 1, wherein said primary backing fabric comprises woven yarns and said secondary backing fabric comprises nonwoven fabric.

6. A tufted carpet, as set forth in claim 1, wherein said primary backing fabric is a nonwoven, carded, crosslaid, needlepunched fabric having a side at least partially heat-treated.

7. A tufted carpet, as set forth in claim 6, wherein said secondary backing is a nonwoven, carded, crosslaid, fabric attached to a non-heat treated side of said primary backing fabric by needlepunching.

8. A tufted carpet, as set forth in claim 7, wherein said primary backing fabric and said secondary backing fabric employ 5 denier×4 inch fibers.

9. A tufted carpet, as set forth in claim 8, wherein said primary backing fabric has a fabric weight of from about 3 to about 6 ounces per square yard.

10. A tufted carpet, as set forth in claim 8, wherein said secondary backing fabric has a fabric weight of from about 4 to about 8 ounces per square yard.

11. A tufted carpet, as set forth in claim 1, un-subjected to wet processing.

12. A tufted carpet, as set forth in claim 1, wherein said face yarns have been dyed to the desired carpet color prior to tufting.

13. A tufted carpet comprising:

face yarns;

a primary backing fabric, said face yarns being tufted into said primary backing fabric; and a secondary backing fabric attached to said primary backing fabric without the use of an adhesive binder, wherein said primary backing fabric and said secondary backing fabric consist essentially of polypropylene fibers having essentially the same melt temperature such that substantially all adjacent fibers of said primary backing fabric and said secondary backing fabric are thermally bonded together thereby locking substantially all of said face yarns within said primary backing fabric.

14. A tufted carpet, as set forth in claim 13, wherein said face yarns are selected from the group consisting of polyolefins, polyamides, and mixtures thereof.

15. A tufted carpet, as set forth in claim 13, un-subjected to wet processing.

16. A tufted carpet, as set forth in claim 13, wherein said primary backing fabric comprises nonwoven fabric and said secondary backing fabric comprises woven yarns.

17. A tufted carpet, as set forth in claim 13, wherein said primary and said secondary backing fabrics comprise nonwoven fabrics.

18. A tufted carpet, as set forth in claim 13, wherein said primary backing fabric comprises woven yarns and said secondary backing fabric comprises nonwoven fabric.

19. A tufted carpet, as set forth in claim 13, wherein said primary backing fabric is a nonwoven, carded, crosslaid, needlepunched fabric having a side at least partially heat-treated, and wherein said secondary backing is a nonwoven, carded, crosslaid fabric attached to a non-heat treated side of said primary backing fabric by needlepunching.

20. A tufted carpet, as set forth in claim 19, wherein said primary backing fabric and said secondary backing fabric employ 5 denier×4 inch fibers, and wherein said primary backing fabric has a fabric weight of from about 3 to about 6 ounces per square yard.

21. A non-wet processed tufted carpet comprising face yarns, a primary backing fabric, and a secondary backing fabric, all consisting essentially of polypropylene fibers having essentially the same melt temperature, wherein the tufted carpet is produced by the method of:

tufting said face yarns to the primary backing fabric;

attaching the primary backing fabric to the secondary backing fabric without the use of an adhesive binder; and heating a non-wet surface of the secondary backing fabric non-adjacent to the primary backing fabric to partially melt the polypropylene fibers of the secondary backing fabric, thereby securing the face yarn to the primary backing fabric, the method being devoid of any dyeing or wet processing step subsequent to the step of tufting said face yarn to the primary backing fabric.

* * * * *